Patented Jan. 7, 1936

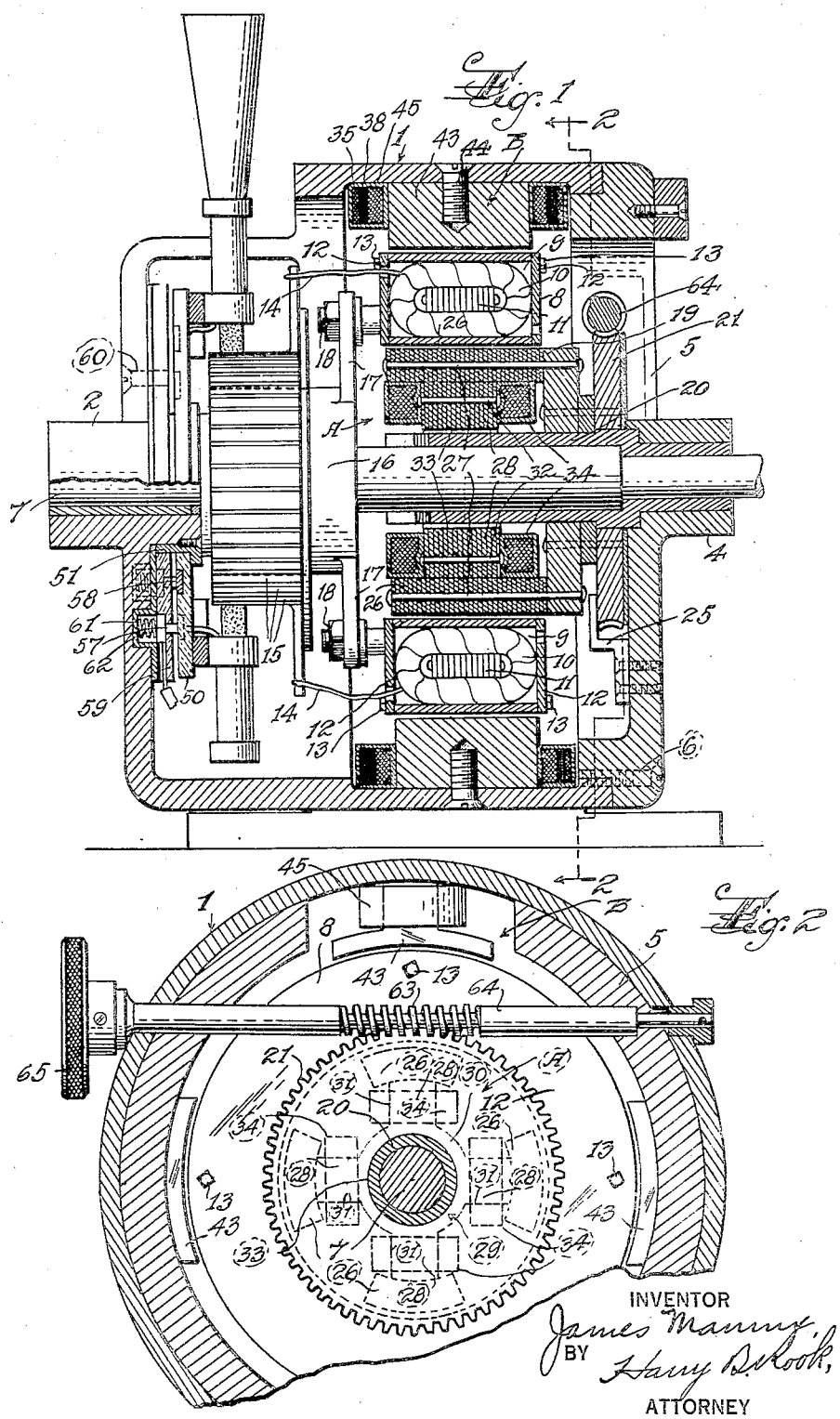

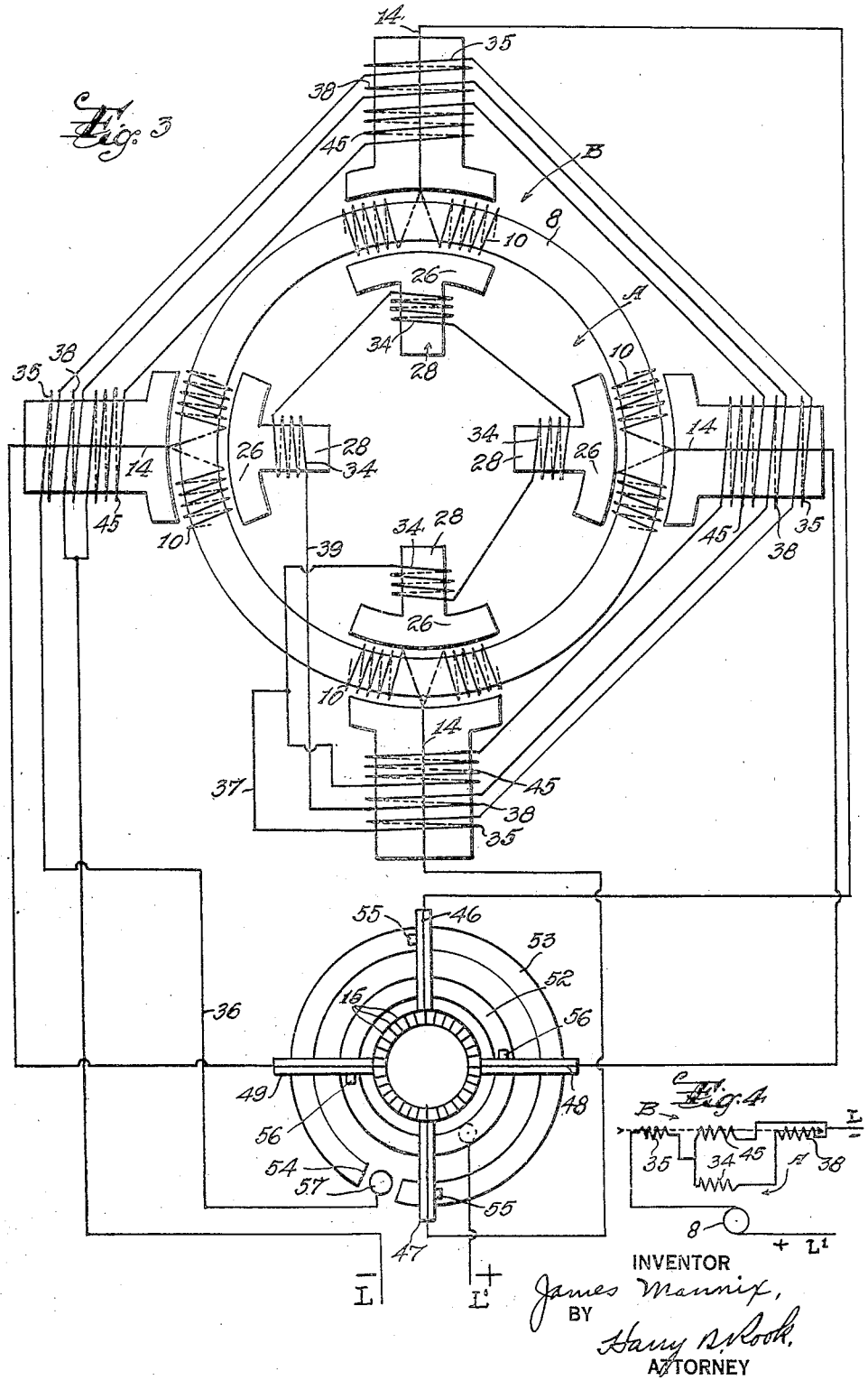

2,026,642

UNITED STATES PATENT OFFICE 2,026,642

ELECTRIC MOTOR

James Mannix, Trenton, N. J.

Application July 13, 1934, Serial No. 734,922

5 Claims. (Cl. 172—276)

This invention relates in general to a motor of the type described in Patents Nos. 1,856,146 and 1,856,147 which has an annular armature and a field divided into two sections one section being disposed within the armature coaxially therewith and the other section surrounding the armature in concentric relation thereto. The armature includes a series of windings, and the motor includes a commutator and brushes co-operating therewith. Each section of the field includes at least two opposite poles, preferably two pairs of poles, each pair arranged in a common axial plane at right angles to the plane of the other pair, and the corresponding poles of each section, for example the north poles and the south poles of each section, are arranged in opposed relation to the north poles and the south poles of the other section. One of the sections is rotatable, preferably the inner section, so that the poles of one section can be moved relatively to the poles of the other section to vary the extent of the magnetic fields actuating the armature so as to vary the speed of rotation of the armature.

When such a motor is operated by alternating current, considerable difficulty is encountered in sparking at the brushes, and also considerable variations in the power factor occurs with variations in the speed and load, and the power factor is low.

One object of the present invention is to provide a novel and improved means for preventing or reducing the sparking at the brushes of motors of this general type and to cause the motor to operate with a high and substantially constant power factor regardless of variations in the load or speed.

In motors of the general type described, the inner and outer sections of the field includes windings, and my invention contemplates the provision of two additional corrective windings for each pole of one section preferably the outer section, said corrective windings being in inductive relation to the main field winding, and one corrective winding being electrically connected in circuit with the inner and outer field sections while the other corrective winding is electrically connected in series with the winding of the other or inner field section.

Other objects, advantages and results of the invention will appear from the following description when read in connection with the accompanying drawings.

For the purpose of illustrating the principles of my invention I have shown it in connection with a motor having a construction substantially the same as that shown in the above-mentioned two patents, although it should be understood that the invention may be embodied in motors of different construction.

Referring to said drawings, Figure 1 is a vertical longitudinal sectional view through the motor, Figure 2 is a transverse vertical sectional view on the line 2—2 of Figure 1.

Figure 3 is a schematic view of the motor and its circuits, and

Figure 4 is a wiring diagram of the motor.

Specifically describing the illustrated embodiment of the invention, the reference character 1 designates the frame of the motor which is of the usual construction and provided at one end with a bearing 2 supported by a spider integral with the frame, and at the other end with a bearing 4 in a spider 5 separable from the frame as by screws 6 in the usual way. Within the frame and journaled in the bearings 4 is a shaft 7 upon which is mounted an armature such as that shown in Patent No. 1,856,147. This armature comprises an annular or ring-like body section 8, preferably formed of laminations of magnetic metal, and having a plurality of openings 9 extending longitudinally through the body portion and equidistantly spaced circumferentially thereof and arranged substantially radially with respect to the axis of the body portion. Within each of the openings 8 is arranged a winding or coil 10 about a core piece 11, preferably laminated, said coils or windings being insulated from the body portion in the usual way and being held against movement out of the openings by end plates 12 secured to the respective ends of the body 8 as by bolts or screws 13. These end plates are preferably perforated or spider-like in form so as to permit ventilation of the coils 10. The coils 10 are connected in series as usual and each coil is connected through a conductor 14 to one bar of the commutator which consists of the usual annularly arranged and insulated bars 15. The commutator is concentric with the shaft 7 and is shown as mounted on a sleeve 16 having radial arms 17 which are connected by bolts 18 to one of the end plates 12, whereby the armature body 8 is mounted on the shaft 7. Obviously the sleeve 16 must be fast on the shaft so that the shaft will rotate with the armature.

The field of the motor includes an inner section A mounted on the end spider 5 and disposed coaxially with the armature 8 at the inside thereof, and an outer section B which is secured to the frame 1 at the outside of the armature and concentric therewith. The inner section A consists of a base 19 rotatably mounted upon a bushing 20 projecting inwardly from the spider 5. To one side of this base 19 is secured a worm wheel 21 which is rotatable upon the bushing 20. The worm wheel is also held against movement in an axial direction by any suitable means such as clips 25 secured to the end spider and overlying the worm wheel. At the edge of the base 19 are a plurality of pole shoes 26 formed of laminations and arcuate concentrically with shaft 7, as shown in Figure 2. The laminations of the pole shoes 26 may be secured to the base portion by rivets or the like 27. Supported within the pole shoes preferably in snug frictional but separable contact therewith, is a core section 28 formed of substantially cross-shaped laminations 29 each having a ring-like portion 30 and radial arms 31. These laminations are secured together by rivets 32. This core section has a central opening 33 to loosely receive the shaft 7 of the motor and the bushing 20, and when in operation the core section is slipped within the pole shoes 26 with one of the arms 31 frictionally but separably engaging each of the pole shoes. Around each of the arms of the core section is a winding or coil 34. As shown on the drawings, there are four pole shoes arranged in two pairs which are disposed at substantially right angles to each other, diametrically opposite pole shoes being similar and complemental, that is, north or south poles. The coils 34 are connected in series with each other.

The outer field section includes four poles 43 arranged in two pairs, one pole of each pair being arranged directly opposite the corresponding pole of the inner field section; that is, each north pole of the outer field section is arranged at the outside of the armature opposite one north pole of the inner field section on the inside of the armature. These poles 43 are secured to the frame of the motor as by screws 44. Around each of the poles 43 is a winding 45, and these windings are connected in series with each other.

The motor is provided with four brushes 46, 47, 48, and 49, adjacent brushes being arranged at substantially right angles to each other, and the diametrically opposite brushes being connected to the same side of the circuit. These brushes are mounted upon a disc 50 of insulation rotatable upon a bushing 51 secured to the bearing 2 of the motor, and the disc is arranged to rotate so that the brushes may be rotated about the commutator.

At the side of the disc 50 opposite the brushes are two conducting bars 52 and 53 concentric with each other and the disc. The outer bar 52 is split at 54, while the inner bar 53 is continuous. Two of the brushes, in the present instance the brushes 46 and 47, are electrically connected as by wires 55 to the bar 53, while the other brushes are connected as by wires 56 to the other bar 52.

With the outer bar 53 cooperates a spring contact stud 57 mounted in the end spider as shown in Figure 1. A similar spring stud 58 cooperates with the other conducting bar 52.

Preferably the spring contact studs 57 and 58 are mounted in a second disc 59 of insulation secured against movement upon the spider 3 as by screws 60. Obviously the contact studs and the springs 61 are insulated from the frame of the motor by cups 62 formed of insulating material in which the springs are mounted and the studs are slidable.

One of the brushes, preferably the upper one, is provided with a handle for rotating the brush-supporting disc 50.

For rotating the inner field section A, I provide a worm 63 mounted on a shaft 64 journaled in the end spider 5 and meshing with a worm wheel 21. The outer end of the shaft 64 has a hand wheel 65 for rotating the shaft.

As shown in Figure 3 of the drawings, the armature windings are connected to the respective commutator bars, and the windings 45 and 34 of the two field sections are connected in parallel with each other as shown in Figure 3.

To provide a substantially constant and high power factor, I utilize two corrective windings for each pole of the field, preferably on the outer section, in inductive relation to the main field winding and in series with the armature winding. Referring particularly to Figure 3, one of these windings for each pole is designated 35, and is connected in series with the corresponding windings of the other poles. These windings 35 are also connected in series with the armature by a wire 36 leading to the contact 57. The windings 35 are also connected by a wire 37 in series with the parallel combination of the main outer and inner field windings 45 and 34 respectively.

The other corrective winding for each pole is designated 38, and these windings are also in series with each other and are connected to one line wire L, and by a wire 39 are connected in series with the inner field windings 34.

While the number of turns of wire in each of the windings 45, 34, 35 and 38 may be widely varied I have found that windings 45 having 240 turns, windings 34 having 200 turns, windings 35 having 40 turns per pole, and windings 38 having 30 turns per pole, are satisfactory.

The corrective windings 35 and 38 are wound and connected in cumulative relation to the outer and inner field windings and appear to have a transformer action with respect to the outer field windings 45. The corrective windings 38 being in inductive relation to the windings 35 and 45, and the winding 38 being in series with the inner field winding 34, appear to bring the inner field section into phase with the outer field section, and the two corrective windings stabilize the phase of the current in the outer and inner field sections. This results in a high and substantially constant power factor. It is well known that in motors of this general character the low power factor results from the inductance of the field and armature windings causing the current to lag behind the supply voltage in phase, and the corrective coils of my motor appear to bring the current and supply voltage more nearly into phase so as to stabilize the phase.

The operation of the motor will be understood from the foregoing, but it may be generally described as follows. With the parts located as shown in Figures 1 and 3 of the drawings, the contact stud 57 is located between the ends of the contact bar 52 and out of electrical contact with the bar so as to break the circuit through the motor. This construction thus serves as a switch. Upon rotation of the disc 50 in one direction, the circuit is closed by contact of the stud 57 with the bar 52 and the armature starts to rotate in one direction. Assuming the brushes to be in the neutral position shown in Figure 3, when the brushes are rotated in the other direction, the armature is rotated in the direction opposite to that first described. The speed of rotation of the armature can be varied by rotating the brushes toward and from the neutral point. Therefore, both the direction of rotation of the armature and the speed thereof may be controlled by simple movement of the brushes, and furthermore when the brushes are in neutral position the circuit is automatically broken by disengagement of the bar 52 from the contact stud 57.

The speed and direction of rotation of the armature may also be varied by rotation of the inner field section A. With the current closed by contact of the stud 57 with the bar 52, and the inner poles arranged directly opposite the corresponding outer poles and the brushes, as shown in Figure 3, rotation of the inner field section by turning of the hand wheel 65 will cause variations in the speed of rotation of the armature due to the movement of the poles of the inner sections out of alinement with the complemental poles of the outer sections which changes the magnetic fields affecting the armature windings.

Obviously, if desired, the rotatable brushes and the switch and the circuit control mechanism including the contact bars 52 and 53 and the contact studs 57 and 58, may be omitted, and the usual fixed brush mechanism utilized instead.

While I have shown and described the invention as embodied in a certain type of motor and in certain details of construction it should be understood that this is primarily for the purpose of illustrating the principles of the invention and that the invention can be utilized in other types of motor and many modifications and changes may be made in the details of construction without departing from the spirit or scope of the invention.

Having thus described my invention, what I claim is:

1. An electric motor comprising an annular armature, a commutator and brushes, a field including two sections one within said armature and the other outside of and concentric with the armature, each section including field cores and windings connected in series with said armature, and two corrective windings inductively related to one of said field sections, one corrective winding connected in circuit with the windings of the inner and outer field sections and the other corrective winding connected in series with the windings of the field section opposite that to which the corrective windings are inductively related.

2. An electric motor comprising an annular armature, a commutator and brushes, a field including two sections one within said armature and the other outside of and concentric with the armature, each section including field cores and windings connected in series with said armature, and two corrective windings inductively related to the outer field section, one corrective winding connected in circuit with the windings of the outer and inner field sections and the other corrective winding connected in series with the winding of the inner field section.

3. An electric motor comprising an annular armature, a commutator and brushes, a field including two sections, one within said armature and the other outside of and concentric with the armature, each section including field cores and windings connected in series with said armature, and two corrective windings inductively related to one of said field sections and connected in series with said armature, the windings of said outer and inner field sections being connected in parallel with each other, and one of said corrective windings being connected in series with said parallel combination of the field windings, while the other corrective winding is connected in series with the winding of the other field section.

4. An electric motor comprising an annular armature, a commutator and brushes, a field including two sections one within said armature and the other outside of and concentric with the armature, each section including field cores and windings connected in series with said armature, and two corrective windings inductively related to the outer field section and connected in series with the armature, the windings of said outer and inner field sections being connected in parallel with each other and one of said corrective windings being connected in series with the parallel combination of said field windings while the other corrective winding is in series with the winding of the inner field section.

5. An electric motor comprising an annular armature, a commutator and brushes, a field including two sections one within said armature and the other outside of and concentric with the armature, each section including field cores and windings connected in series with said armature, the windings of said outer and inner field sections being connected in parallel with each other, a corrective winding inductively superimposed upon the outer field section and having one terminal connected in series with the armature and the other terminal connected to one terminal of each of the outer and inner field windings, and a second corrective coil superimposed in inductive relation to the outer field section and the first corrective winding and connected in series with the winding of the inner field section.

JAMES MANNIX.